Patented Feb. 7, 1933

1,896,815

UNITED STATES PATENT OFFICE

MAX GOLDBERG, OF NEW YORK, N. Y.

FABRIC TREATING COMPOUND

No Drawing.     Application filed February 9, 1929.   Serial No. 338,711.

My invention relates to coating compositions, and has for its object to provide a composition which when spread and dried on a surface of a fabric, will prevent unraveling or fraying of the edges of such fabric, particularly, when the fabric is cut to a certain size or in the form of a design, as in appliqué work, and which will have a soft finish, agreeable to the touch, and will not alter the texture, appearance, or flexibility of the fabric.

My improved coating composition comprises a mixture of pyroxylin, a phthalic acid ester dissolved in a solvent, and a softening agent, such as castor oil. The phthalic acid ester preferred by me is diethyl phthalate, which may be dissolved in a mixture of methyl alcohol and benzol. A mixture which I have found to give very satisfactory results has the following composition: 8 parts pyroxylin, 1 part of a mixture which I call "flex" and which comprises diethyl phthalate dissolved in methyl alcohol and benzol, 1 part castor oil.

In preparing the mixture, the ingredients are mixed together and permitted to set for about three weeks, with occasional stirring. The product finally obtained is a colloidal solution of castor oil and "flex" in the pyroxylin. This material is then spread in any suitable manner upon the surface of a fabric.

The mixture forming this material, after being spread upon the surface of the fabric, particularly, the under surface of the fabric, forms a film or coating for the respective threads of the fabric when dried. This coating, however, has the property of remaining flexible after drying, so that the fabric carrying the same remains as pliable and soft as it was before the application of this material thereto.

In place of the castor oil, other known softeners for pyroxylin may be used, while any other suitable solvent for the phthalic acid ester may be employed. The above proportions are by no means critical and may be varied considerably without altering the essential character of the composition.

Other variations may be resorted to within the scope of the appended claims without departing from the spirit of the invention.

I claim:

1. A coating composition for fabrics, to prevent unraveling and fraying of the cut edges thereof, consisting of a mixture of pyroxylin, castor oil, diethyl phthalate, methyl alcohol and benzol, in such proportions as to form, on drying, a flexible film for the respective threads of a fabric, said coating being of a nature as not to affect the texture, appearance or flexibility of the fabric.

2. A coating composition for fabrics, to prevent unraveling and fraying of the cut edges thereof, consisting of a mixture of eight parts of pyroxylin, one part of castor oil, and one part of diethyl phthalate dissolved in methyl alcohol and benzol, said mixture forming, upon drying, a flexible film for the respective threads of a fabric, said coating being of a nature not to affect the texture, appearance or flexibility of the fabric.

MAX GOLDBERG.